(12) United States Patent
Jiang et al.

(10) Patent No.: US 11,483,811 B2
(45) Date of Patent: Oct. 25, 2022

(54) METHOD AND APPARATUS FOR SIGNAL CONFIGURATION IN A WIRELESS COMMUNICATION SYSTEM

(71) Applicant: NEC CORPORATION, Tokyo (JP)

(72) Inventors: Chuangxin Jiang, Beijing (CN); Yukai Gao, Beijing (CN); Hongmei Liu, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 581 days.

(21) Appl. No.: 16/314,293

(22) PCT Filed: Jun. 30, 2016

(86) PCT No.: PCT/CN2016/087925
§ 371 (c)(1),
(2) Date: Dec. 28, 2018

(87) PCT Pub. No.: WO2018/000341
PCT Pub. Date: Jan. 4, 2018

(65) Prior Publication Data
US 2021/0266873 A1    Aug. 26, 2021

(51) Int. Cl.
*H04W 72/04* (2009.01)
*H04W 56/00* (2009.01)
*H04L 5/00* (2006.01)

(52) U.S. Cl.
CPC ..... *H04W 72/042* (2013.01); *H04W 56/0015* (2013.01); *H04L 5/0048* (2013.01); *H04L 5/0053* (2013.01); *H04L 5/0091* (2013.01)

(58) Field of Classification Search
CPC .... H04L 5/0053; H04W 48/04; H04W 48/12; H04W 48/16; H04W 72/1289; H04W 84/045
(Continued)

(56) References Cited

U.S. PATENT DOCUMENTS

2010/0273506 A1    10/2010    Stern-Berkowitz et al.
2010/0296429 A1    11/2010    Han et al.
(Continued)

FOREIGN PATENT DOCUMENTS

CN    101877865 A    11/2010
CN    102239647 A    11/2011
(Continued)

OTHER PUBLICATIONS

International Search Report for PCT/CN2016/087925 dated Feb. 15, 2017 (PCT/ISA/210).
(Continued)

*Primary Examiner* — Robert J Lopata
(74) *Attorney, Agent, or Firm* — Sughrue Mion, PLLC

(57) ABSTRACT

Embodiments of the present disclosure provide methods, apparatuses and computer program for signal configuration in a wireless communication system. A method implemented at a network device comprises: transmitting information related to a resource allocation for a signal, and broadcasting the signal in accordance with the resource allocation; wherein the signal includes at least one of: a reference signal and a control signal containing system information. By virtue of the method, resource utilization may be more flexibly controlled.

15 Claims, 9 Drawing Sheets

(58) Field of Classification Search
USPC .......................................................... 370/329
See application file for complete search history.

(56) References Cited

U.S. PATENT DOCUMENTS

| | | |
|---|---|---|
| 2011/0305211 A1 | 12/2011 | Lunttila et al. |
| 2014/0036747 A1 | 2/2014 | Nory et al. |
| 2014/0334372 A1 | 11/2014 | Vos |
| 2015/0256308 A1 | 9/2015 | Ma et al. |
| 2016/0028463 A1 | 1/2016 | Wang et al. |
| 2016/0119095 A1 | 4/2016 | Lee et al. |
| 2017/0290008 A1* | 10/2017 | Tooher .................. H04L 1/0007 |
| 2017/0311276 A1 | 10/2017 | Tsai et al. |
| 2017/0332359 A1* | 11/2017 | Tsai ...................... H04B 7/0639 |
| 2017/0353254 A1* | 12/2017 | Islam ................... H01Q 3/2605 |
| 2019/0036634 A1* | 1/2019 | Cheng ................ H04L 27/2666 |
| 2019/0075602 A1* | 3/2019 | Lin ..................... H04W 72/0453 |
| 2019/0081842 A1* | 3/2019 | Kim .................. H04L 27/26025 |
| 2019/0149309 A1* | 5/2019 | Kuang ................ H04W 72/042 370/329 |
| 2019/0149384 A1* | 5/2019 | Kim .................... H04L 27/2666 370/328 |
| 2019/0230580 A1 | 7/2019 | Kim et al. |
| 2020/0099499 A1* | 3/2020 | Yeo ....................... H04L 1/0009 |
| 2020/0336249 A1 | 10/2020 | Yi et al. |

FOREIGN PATENT DOCUMENTS

| | | |
|---|---|---|
| CN | 102740463 A | 10/2012 |
| CN | 103582141 A | 2/2014 |
| CN | 104255053 A | 12/2014 |
| CN | 104349484 A | 2/2015 |
| EP | 2915355 B1 | 7/2019 |
| WO | 2010/138768 A1 | 12/2010 |
| WO | 2014101810 A1 | 7/2014 |
| WO | 2014166032 A1 | 10/2014 |
| WO | 2016/004279 A1 | 1/2016 |
| WO | 2016/024825 A1 | 2/2016 |
| WO | 2016/040290 A1 | 3/2016 |
| WO | 2016/047618 A1 | 3/2016 |
| WO | 2016/048422 A1 | 3/2016 |

OTHER PUBLICATIONS

Decision of Dismissal of Amendment dated Aug. 18, 2020 issued by the Japanese Patent Office in application No. 2018-568280.
Decision of Refusal dated Aug. 18, 2020 issued by the Japanese Patent Office in application No. 2018-568280.
U.S. Appl. No. 62/334,935, filed May 11, 2016, Tsai, A., et al.
U.S. Appl. No. 62/269,853, filed Dec. 18, 2015, Ang, P. et al.
"3rd Generation Partnership Project; Technical Specification Group Radio Access Network; Evolved Universal Terrestrial Radio Access (E-UTRA); Physical layer procedures (Release 13)", 3GPP TS 36.213 V13.1.1, Mar. 2016, pp. 1-361 (361 pages total).
Ericsson, "Solution principles for system information distribution", 3GPP TSG-RAN WG2 Meeting #94, Tdoc R2-163997, Nanjing, P.R. China, May 23-27, 2016, pp. 1-4 (4 pages total).
NEC, "Proposals for forward compatibility", 3GPP TSG-RAN WG1 Meeting #86, R1-166636, Gothenburg, Sweden, Aug. 22-26, 2016, pp. 1-2 (2 pages total).
Huawei, "Forward compatibility consideration on reference signals and control information/channels", 3GPP TSG-RAN WG1 Meeting #85, R1-164046, Nanjing, China, May 23-27, 2016, pp. 1-3 (3 pages total).
"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331 v13.1.0, Mar. 2016, pp. 1-551 (551 pages total).
Partial Supplementary European Search Report dated Jan. 27, 2020, issued by the European Patent Office in Application No. 16906742.8.
Communication dated Aug. 3, 2020, from the Japanese Patent Office in Application No. 2018-568280.
Intel Corporation, "On System Operation and Common Control Messages for NB-IoT", 3GPP TSG RAN WG1 NB-IoT Ad-Hoc Meeting, Jan. 18-20, 2016, R1-160134, pp. 2-6 (total 5 pages).
Samsung, "SIB-1 Scheduling for Low Cost UEs", 3GPP TSG RAN WG1 #81, May 25-29, 2015, R1-152842, pp. 2-5 (total 4 pages).
[Huawei] RAN WG1, "[Draft] LS on NB-IoT", 3GPP TSG RAN WG1 Meeting #84bis, Apr. 11-15, 2016, R1-163446, pp. 2-4/E (total 3 pages).
Huawei et al., "Remaining NB-IoT random access physical layer aspects", 3GPP TSG RAN WG1 Meeting #84, R1-160327, pp. 2-6/E (total 5 pages).
Communication dated Dec. 24, 2019 from Japanese Patent Office in counterpart JP Application No. 2018-568280.
Communication dated Jul. 28, 2020, from the European Patent Office in European Application No. 16906742.8.
Communication dated Feb. 10, 2021, issued by the Japanese Patent Office in application No. 2018-568280.
Search Report dated Dec. 5, 2019 in Japanese Application No. 2018-568280.
Huawei et al., "Initial access in NR", 3GPP TSG-RAN WG2 Meeting #94, R2-163923, Nanjing, China, May 23-27, 2016 (4 pages total).
Nokia Networks, "Basic system design for UL NB-IoT", 3GPP TSG-RAN WG1 NB-IoT Adhoc, R1-160041, Budapest, Hungary, Jan. 18-20, 2016 (2 pages total).
Japanese Office Action for JP Application No. 2020-190215 dated Jan. 4, 2022 with English Translation.
CATT, "Introduction of Virtual Cell", 3GPP TSG-RAN WG2 Meeting #93bis, R2-162571, Apr. 2, 2016, Croatia.
CATT, "Numerology for the 5G new radio interface", 3GPP TSG-RAN WG1 Meeting #84bis, R1-162307, Apr. 2, 2016, Korea.
CATT, "Consideration on higher layer procedures in 5G NR", 3GPP TSG-RAN WG2 Meeting #93bis, R2-162568, Apr. 2, 2016, Croatia.
ETRI, "Scalable TTI for new radio frame structure", 3GPP TSG RAN WG1 Meeting #84bis, R1-162569, Apr. 1, 2016, Korea.
CATT, "System Information in NR", 3GPP TSG RAN WG2 Meeting #94, R2-163470, May 14, 2016, China.
Huawei, HiSilicon, "Impact of directional transmission on NR numerology for high frequency bands", 3GPP TSG RAN WG1 Meeting #85bis, R1-164381, May 13, 2016, China.
Office Action dated Jun. 7, 2022 in Japanese Application No. 2020-190215.
Chinese Office Action corresponding to Chinese Patent Application No. 201680087164X, dated Aug. 31, 2022.

* cited by examiner

METHOD AND APPARATUS FOR SIGNAL CONFIGURATION IN A WIRELESS COMMUNICATION SYSTEM

TECHNICAL FIELD

The non-limiting and example embodiments of the present disclosure generally relate to a technical field of wireless communications, and specifically to methods, apparatuses and computer programs for signal configuration in a wireless communication system.

BACKGROUND

This section introduces aspects that may facilitate a better understanding of the disclosure. Accordingly, the statements of this section are to be read in this light and are not to be understood as admissions about what is in the prior art or what is not in the prior art.

Motivated by emerging new services and increasing data traffic demand from users, more advanced wireless communication technique is now being studied, for example in the third generation partnership project (3GPP). One example of the more advanced wireless communication technique is called Next Radio which is also referred to as NR in 3GPP. In 3GPP RAN #71 meeting, a study item for a NR system was approved. The NR system to be developed may support a frequency range up to 100 GHz, with an objective of using a single technical framework to address all usage scenarios, requirements and deployment scenarios defined in 3GPP TR38.913, which includes: enhanced mobile broadband, massive machine-type-communications, and ultra-reliable and low latency communications.

At an initial stage of the study item for the NR system, it is important to gain a common understanding on a requirement for the NR system in terms of radio protocol structure and architecture, and a progress in the following areas is prioritized:

Fundamental physical layer signal structure for new RAT,
Waveform based on OFDM, with potential support of non-orthogonal waveform and multiple access,
other waveforms if they demonstrate justifiable gain,
Basic frame structure(s), and
Channel coding scheme(s).

To facilitate a smooth evolution, it is assumed that standardization for a new radio access technology (RAT, e.g., the NR system) may include two phases. Phase I specification of the new RAT should be forward compatible in terms of efficient co-cell/site/carrier operation with Phase II specification and beyond, while backward compatibility with a legacy wireless communication system, for example Long Term Evolution (LTE) is not required. Phase II specification of the new RAT builds on the foundation of Phase I specification, with a target of meeting all requirements set for the new RAT. At the same time, a smooth future evolution beyond Phase II needs to be ensured to support later advanced features and to enable support for service requirements identified later than Phase II specification.

To ensure the forward compatibility, one solution is to incorporate envisioned future applications in current design for the NR system. For example, though Phase I of the NR system design may focus on enhanced Mobile BroadBand (eMBB) applications, the features envisioned for a later phase, such as massive Machine Type Communications (mMTC) applications, Ultra-Reliable and Low Latency Communications (URLLC), direct communications, and shared access communication, should also be considered during the development of the phase I. In 3GPP RAN1 #84bis meeting, a basic principle of forward compatibility for the NR system design was agreed as follows:

Phase 1 and later phases of NR should be designed with the following principles to ensure forward compatibility and compatibility of different features:
Strive for
Maximizing the amount of time and frequency resources that can be flexibly utilized or that can be left blanked without causing backward compatibility issues in the future,
Blank resources can be used for future use,
Minimizing transmission of always-on signals,
Confining signals and channels for physical layer functionalities (signals, channels, signaling) within a configurable/allocable time/frequency resource.

SUMMARY

In order to solve at least part of the above problems, methods, apparatuses and computer programs for signal configuration in a wireless communication system are provided in the present disclosure.

In a first aspect of the disclosure, there is provided a method implemented at a network device. The method comprises: transmitting information related to a resource allocation for a signal, and broadcasting the signal in accordance with the resource allocation; wherein the signal includes at least one of: a reference signal and a control signal containing system information.

In one embodiment, said information related to a resource allocation for a signal may indicate at least one of: a bandwidth of a resource allocated to the signal; a location of the resource allocated to the signal; distribution density of the signal in frequency domain; a distribution pattern of the signal in frequency domain; a change of the distribution pattern of the signal with time; and transmission periodicity of the signal in time domain.

In another embodiment, said information may indicate the bandwidth of the resource allocated to the signal by indicating a fraction of a system bandwidth of the network device allocated to the signal. In still another embodiment, said information may indicate the location of the resource allocated to the signal by indicating a group of physical resource blocks allocated to the signal.

In one embodiment, the method may further comprise transmitting the control signal in a resource located within a resource region allocated for the reference signal.

In another embodiment, said transmitting information related to a resource allocation for a signal may comprise transmitting the information via a broadcast channel. In a further embodiment, said transmitting the information via a broadcast channel may comprise transmitting the broadcast channel with a selected cyclic redundancy check (CRC) mask, the CRC mask indicating the information.

In one embodiment, said transmitting information related to a resource allocation for a signal may comprise transmitting a synchronization signal sequence to indicate the information. In another embodiment, transmitting a synchronization signal sequence to indicate the information may comprise transmitting the synchronization signal sequence with an associated indication of the information, the associated indication including at least one of a selected index, a selected type, and a selected root value of the synchronization signal sequence. In a further embodiment, transmitting a synchronization signal sequence to indicate the information may comprise: transmitting a first synchronization signal sequence at a first time instance, and transmitting a second synchronization signal sequence at a second time instance; and a time gap between the first time instance and the second instance indicates the information.

In one embodiment, a system bandwidth of the network device may be divided into a plurality of resource regions, and the method may further comprise transmitting numerology information and/or information related to the resource allocation for the signal for at least one resource region of the plurality of resource regions. In another embodiment, transmitting numerology information and/or information related to the resource allocation for the signal for at least one resource region of the plurality of resource regions may comprise transmitting the numerology information and/or information related to the resource allocation for the signal for the at least one resource region via a broadcast channel in one of the at least one resource region. In a further embodiment, transmitting numerology information and/or information related to the resource allocation for the signal for at least one resource region of the plurality of resource regions may comprise transmitting the numerology information and/or information related to the resource allocation for the signal for a respective resource region of the at least one resource region via a broadcast channel in the respective resource region.

In a second aspect of the disclosure, there is provided a method implemented at a terminal device. The method includes: receiving, from a network device, information related to a resource allocation for a signal; and receiving the signal broadcasted by the network device in accordance with the resource allocation; wherein the signal includes at least one of: a reference signal, and a control signal containing system information.

In a third aspect of the disclosure, there is provided a network device. The network device includes a configuration transmitting unit, configured to transmit information related to a resource allocation for a signal; and a signal transmitting unit, configured to broadcast the signal in accordance with the resource allocation; wherein the signal includes at least one of: a reference signal, and a control signal containing system information.

In a fourth aspect of the disclosure, there is provided a terminal device. The terminal device includes an information receiving unit, configured to receive, from a network device, information related to a resource allocation for a signal; and a signal receiving unit, configured to receive the signal broadcasted by the network device in accordance with the resource allocation; wherein the signal includes at least one of: a reference signal, and a control signal containing system information.

In a fifth aspect of the disclosure, there is provided a network device. The network device includes a processor and a memory, said memory containing instructions executable by said processor, and said processor being configured to cause the network device to perform a method according the first aspect of the present disclosure.

In a sixth aspect of the disclosure, there is provided a terminal device. The terminal device includes a processor and a memory, said memory containing instructions executable by said processor and said processor being configured to cause the terminal device to perform a method according the second aspect of the present disclosure.

In a seventh aspect of the disclosure, there is provided a computer program, comprising instructions which, when executed on at least one processor, cause the at least one processor to carry out a method according to the first aspect of the present disclosure.

In an eighth aspect of the disclosure, there is provided a computer program, comprising instructions which, when executed on at least one processor, cause the at least one processor to carry out a method according to the second aspect of the present disclosure.

According to the various aspects and embodiments as mentioned above, resource utilization may be more flexibly controlled. For example, transmission of a signal (e.g., an always-on signal) may be minimized for different scenarios, and/or, time/frequency resources that can be flexibly utilized or that can be left for future use may be maximized.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
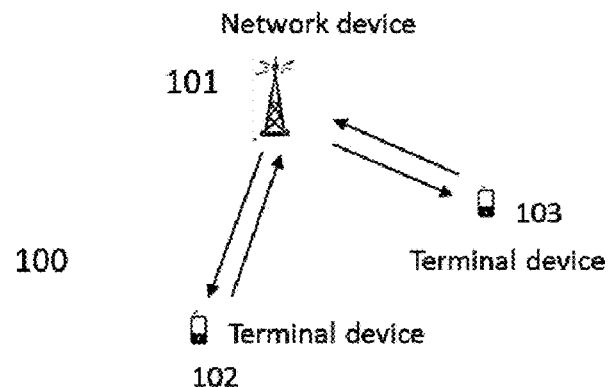
FIG. 1 illustrates an example wireless communication network 100 in which embodiments of the disclosure may be implemented.

Hereinafter, the principle and spirit of the present disclosure will be described with reference to illustrative embodiments. It should be understood, all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," etc. indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that, although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Though for illustration purpose, some embodiments of the present disclosure will be described in a context of the NR system, it should be appreciated that principle of the present disclosure may be more widely used. That is, embodiments of the present disclosure may be implemented in any wireless communication system, e.g., a fifth generation (5G) communication system, and/or any other systems either currently known or to be developed in the future, where similar problems exist.

As used herein, the term "network device" refers to a device in a wireless communication network via which a terminal device accesses the network and receives services therefrom. The network device may refer to a base station (BS) or an access point (AP), for example, a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The term "terminal device" refers to any end device that can access a wireless communication network and receive services therefrom. By way of example and not limitation, a terminal device may be referred to as user equipment (UE), a Subscriber Station (SS), a Portable Subscriber Station, a Mobile Station (MS), or an Access Terminal (AT). The terminal device may include, but not limited to, a mobile phone, a cellular phone, a smart phone, a tablet, a wearable device, a personal digital assistant (PDA), portable computers, image capture terminal devices such as digital cameras, gaming terminal devices, music storage and playback appliances, wearable terminal devices, vehicle-mounted wireless terminal devices and the like. In the following description, the terms "terminal device", "terminal", "user equipment" and "UE" may be used interchangeably.

FIG. 1 illustrates an example wireless communication network 100 in which embodiments of the disclosure may be implemented. As shown in FIG. 1, the wireless communication network 100 may include one or more network devices, for example network device 101, which may be in a form of an eNB. It will be appreciated that the network device 101 could also be in a form of a Node B, BTS (Base Transceiver Station), and/or BSS (Base Station Subsystem), access point (AP) and the like. The network device 101 may provide radio connectivity to a set of terminal devices, for example UEs 102 and 103, within its coverage. A downlink (DL) transmission herein refers to a transmission from the network device to a terminal device, and an uplink (UL) transmission refers to a transmission in an opposite direction.

To access the wireless communication system 100, a terminal device (e.g., the UE 102) has to synchronize with a network device (e.g., the network device 101) first. This can be done, for example by detecting a synchronization signal (SS) transmitted by the network device. Besides the synchronization signal, the UE 102 may also detect a reference signal (RS) from the network device 101 to obtain a finer synchronization. After acquiring the synchronization, the UE 102 still need to obtain some necessary system information from the network device to enable an initial access. Even after establishing a connection with the network device, the UE 102 may still need to perform measurement based on some reference signals from the network device to assist radio resource management (RRM) at the network side. That is to say, some signals will always be transmitted by the network devices, in order to enable initial access of the terminal devices, paging, mobility or other RRM related measurements. These signals may be referred to as "always-on" signals.

In a LTE system, the always-on signals include a primary synchronization signal (PSS), a secondary reference signal (SSS), a common reference signal (CRS), demodulation reference signals (DRS), a master information block (MIB) and system information blocks (SIBs). In a future wireless communication system, for example a NR system, the always-on signals may include less or more or different signals than that of the LTE system. Furthermore, current design for the always-on signals in the LTE system can hardly apply to a NR system, since most of the always-on signals in the LTE system are fixed in resource allocation, which means that the resource occupied by such signals cannot be reused for future purposes. For example, in LTE, the CRS are present in every subframe across the entire system bandwidth. Many LTE functionalities and implementations have been built based on this assumption. As a result, the requirement of forward compatibility cannot be satisfied. Therefore, new signal design for the NR system is required.

To enable forward compatibility, one way is to minimize the transmission of always-on signals. For example, the always-on signal transmissions may be condensed in a time-concentrated manner. Alternatively, the CRS signal may be transmitted with minimum bandwidth in frequency domain. However, it is still open as to how to minimize transmission of always-on signal and/or maximize the amount of time and frequency resources that can be flexibly utilized by a future wireless communication system, for example a phase II NR system.

In order to solve at least part of the above problems, methods, apparatuses and computer programs have been proposed herein. It should be appreciated that embodiments of the disclosure are not limited to a NR system being developed by 3GPP, but could be more widely applied to any scenario where similar problem exists.

Figure 2:
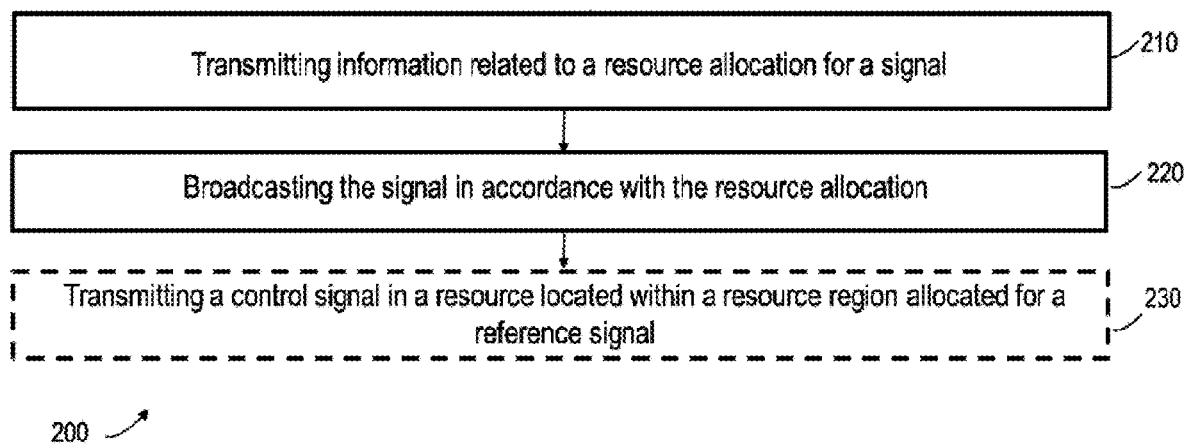
FIG. 2 illustrates a flowchart of a method implemented at a network device according to an embodiment of the present disclosure.

Reference is now made to FIG. 2, which shows a flowchart of a method 200 implemented at a network device side according to an embodiment of the present disclosure. For simplicity, the method 200 will be described below with reference to the network device 101 shown in FIG. 1, however, it can be appreciated that, the method 200 could also be implemented by any other network device.

As illustrated in FIG. 2, at block 210, the network device 101 transmits information related to a resource allocation for a signal. For illustration rather than limitation, in one embodiment, the signal may include at least one of a reference signal and a control signal containing system information. For example, the signal may be an always-on reference signal to be measured by a group of terminal devices or all terminal devices served by the network device, for synchronization and/or RRM measurement. The signal may be a reference signal like the CRS specified in 3GPP LTE. In another example, the signal may be a control signal to be detected by a group of terminal devices or all terminal devices served by the network device, for acquiring system information. The signal may be similar as the SIB specified in LTE. It should be appreciated that embodiments of the present disclosure are not limited to any specific type of the signal. In some embodiments, the signal may be different from the CRS and the SIB, and may be utilized for different purposes.

The operation at block 210 makes resource allocation for the signal configurable, which means that the resource allocated for the signal may be adjusted based on needs. This enables the network device to minimize resource allocation for the signal, and thereby improving resource efficiency.

At block 220, the network device 101 broadcasts the signal in accordance with the resource allocation. In this way, a network device (e.g., the network device 101 in FIG. 1) can control/configure a resource allocation for a signal which is to be broadcasted by the network device and detected by a plurality of terminal devices, and transmit the signal in the configured resource configuration, rather than transmitting the signal in a fixed (for example, wideband) resource as in current LTE. In this way, resources of the network device can be managed more flexibly.

Embodiments of the present disclosure are not limited to any specific configuration message for configuring the resource allocation for the signal. Just for illustration, in one embodiment, the information related to the resource allocation for the signal, which is transmitted at block 210, may indicate at least one of:
  a bandwidth of a resource allocated to the signal;
  a location of the resource allocated to the signal;
  distribution density of the signal in frequency domain;
  a distribution pattern of the signal in frequency domain;
  a change of the distribution pattern of the signal with time; and
  transmission periodicity of the signal in time domain.

In FIGS. 3a-3h, some examples are presented for illustrating the resource allocation of the signal schematically. For simplicity, in these examples the signal is assumed to be a CRS, however, it should be appreciated that embodiments are not limited thereto, and similar principle may be applied to other signals. Likewise, though in these examples a broadcast channel is shown to be PBCH, however, it should be appreciated that embodiments are not limited thereto, and similar principle may be applied to other broadcast channels.

Figure 3A:
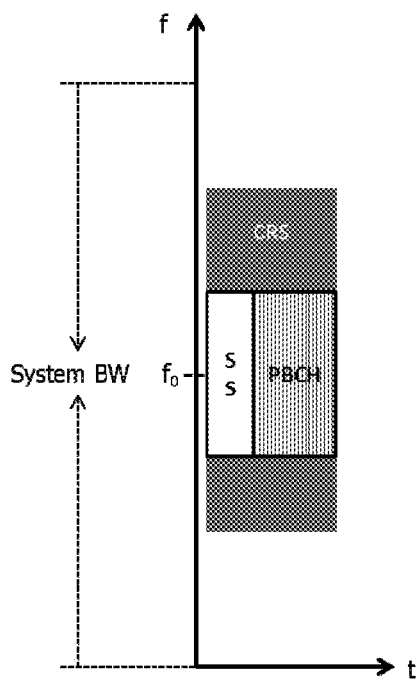
FIGS. 3a-3h illustrate examples for resource allocation for a reference signal.
Figure 3B:
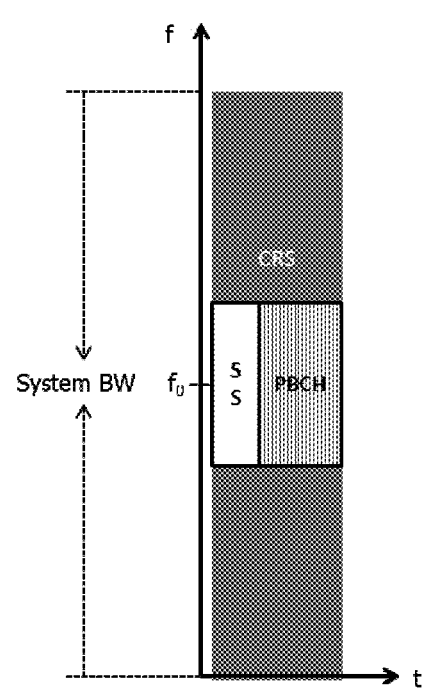

As illustrated in FIG. 3a, in one embodiment, the network device may configure some central frequency resources around $f_0$ within the system bandwidth for the CRS. The bandwidth/position of the allocated resource may be indicated to terminal devices at block 210. In one embodiment, the network device may indicate the bandwidth of the allocated resource by indicating a fraction of a system bandwidth of the network device allocated to the signal. For example, the network device may indicate that ¼, or ½, or ¾, or 1 of the system bandwidth is allocated to the CRS transmission. This may be indicated, for example, via a 2-bits indication. In FIG. 3b, another example is provided where the network device allocates all the available system bandwidth to the CRS transmission.

Though in these examples, the synchronization signal (SS), the physical broadcast channel (PBCH) and the CRS are shown as occurring in a same transmission time interval (TTI), it should be appreciated that these signals/channels can be transmitted in different TTIs in another embodiment.

Figure 3C:
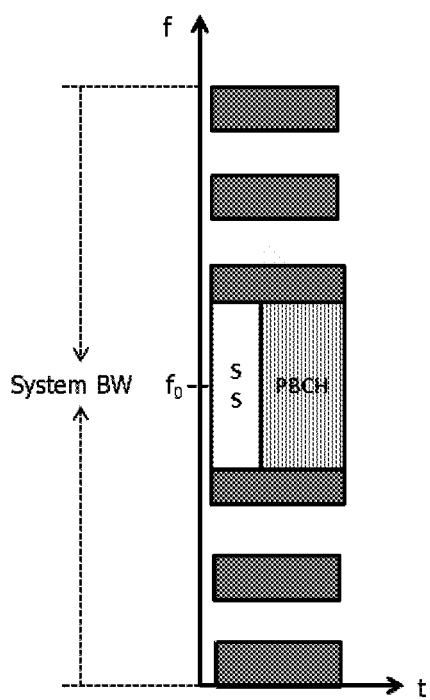
Figure 3D:
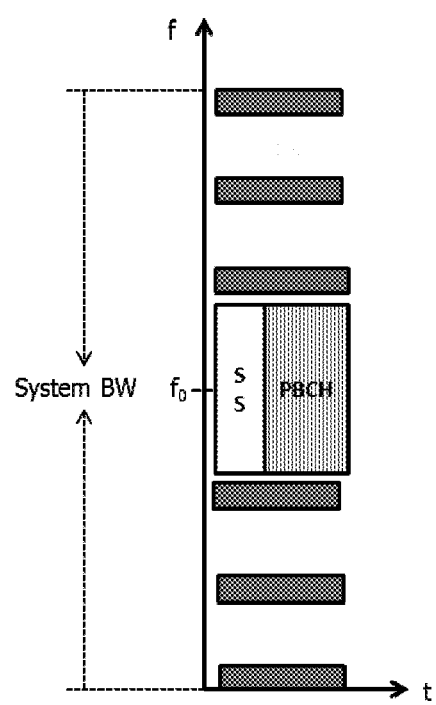

In FIGS. 3c and 3d, examples with distributed resource allocation for the CRS are provided. As illustrated in FIG. 3c, the network device may allocate about ½ of the system bandwidth for CRS, and the allocated resource is distributed in the whole system bandwidth with a density of 0.5. A density of 0.5 means that CRS is only transmitted in even or odd PRBs or PRB groups. In this case, ½ resource (except the central several PRBs) in this time interval can be left for use by future UEs, since there are no always-on signals in the ½ resources.

A distributed resource allocation with a density of 0.25 for the CRS is presented in FIG. 3d. When a 0.25 density, except the central several PRBs, ¾ resource in this time interval can be left for future use as there are no always-on signals.

In one embodiment, the network device 101 may indicate the density and/or bandwidth of the allocated resource to the terminal devices at block 210. In another embodiment, the system bandwidth may be divided into a plurality of resource groups. For instance, there are two groups in the example shown in FIG. 3c, and there are four groups in the example shown in FIG. 3d. Then at block 210, the network device may indicate the group of resources to the terminal device (e.g., listing all the resource blocks being allocated), or indicate a group number, or in other words, an index of the group (e.g., the $2^{nd}$ group), to the terminal device.

Alternatively or additionally, there can be several predefined patterns or densities for CRS resource allocation. Each pattern may indicate a different distribution of the CRS in a frequency domain, or in both frequency and time domains. The network device may indicate a pattern (e.g., an index of the pattern) to the terminal device at block 210.

Figure 3E:
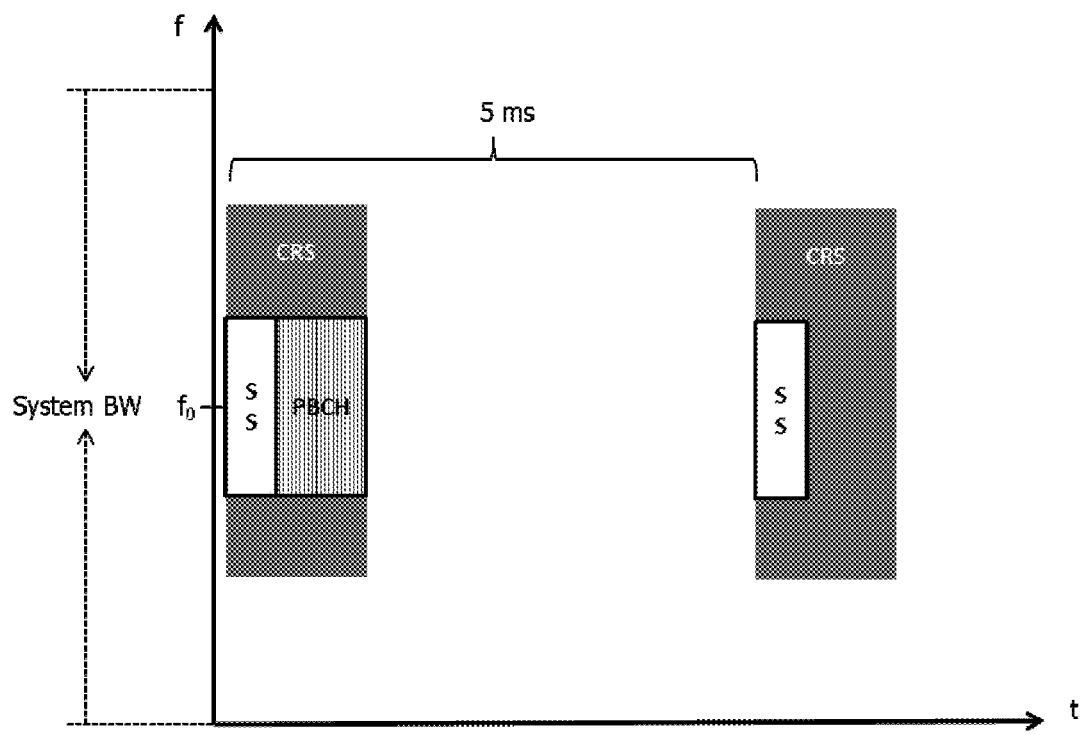

In FIGS. 3e-3h, periodical transmission of the CRS is illustrated schematically. As illustrated in FIG. 3e, the CRS may be transmitted with a 5 ms periodicity. However, it should be appreciated that embodiments of the present disclosure are not limited to any specific periodicity of the signal. In one embodiment, at block 210, the network device may indicate the periodicity to the terminal devices.

Figure 3F:
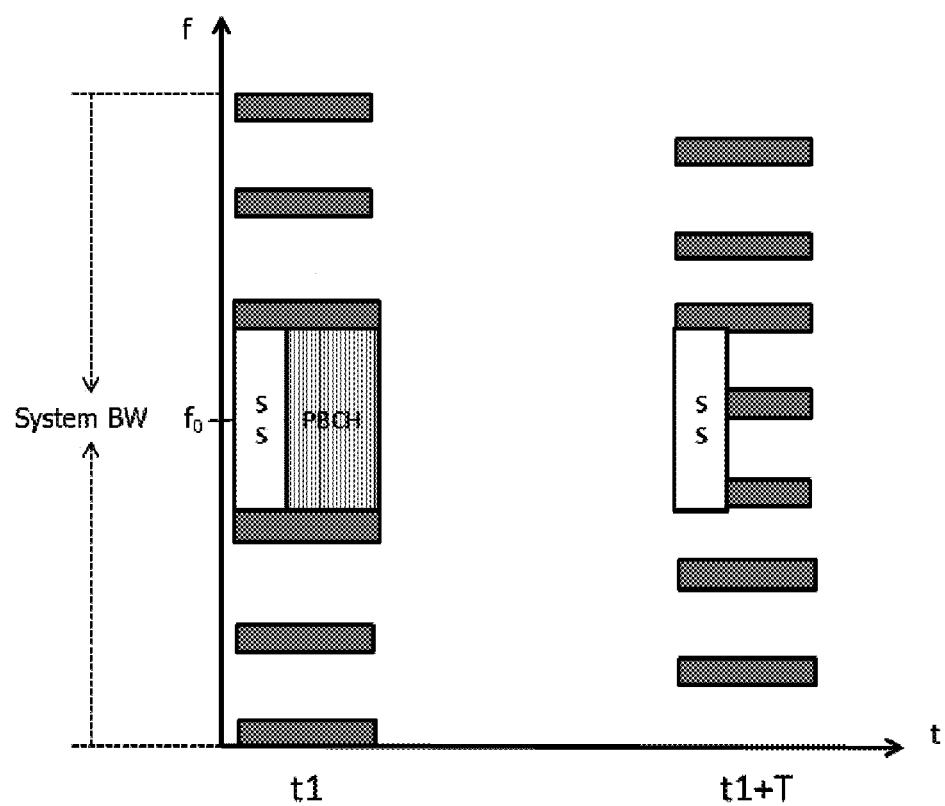
Figure 3G:
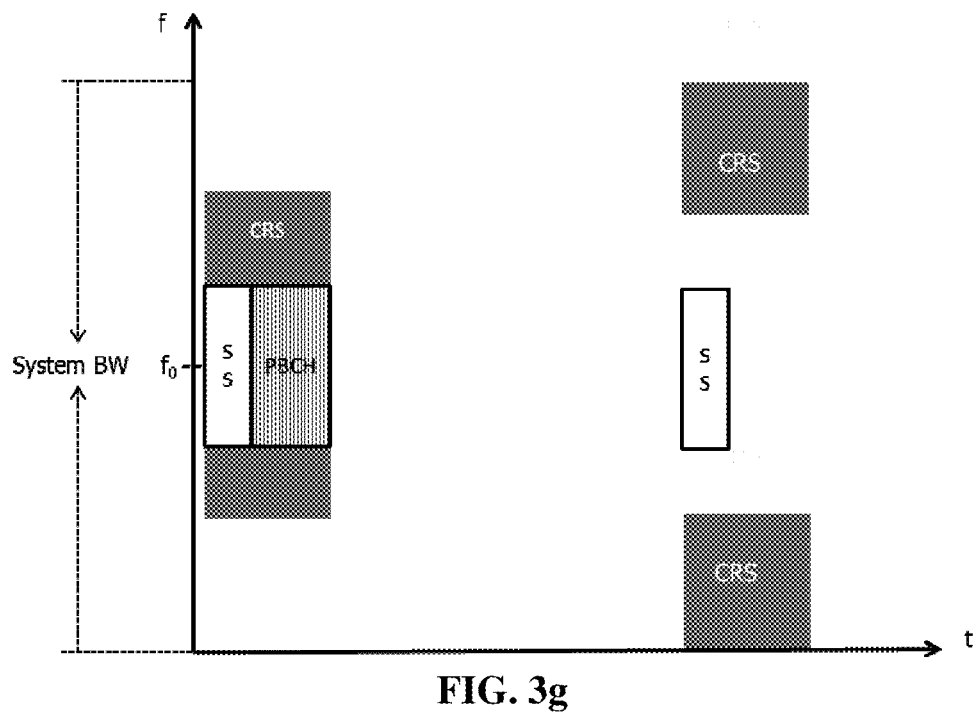
Figure 3H:
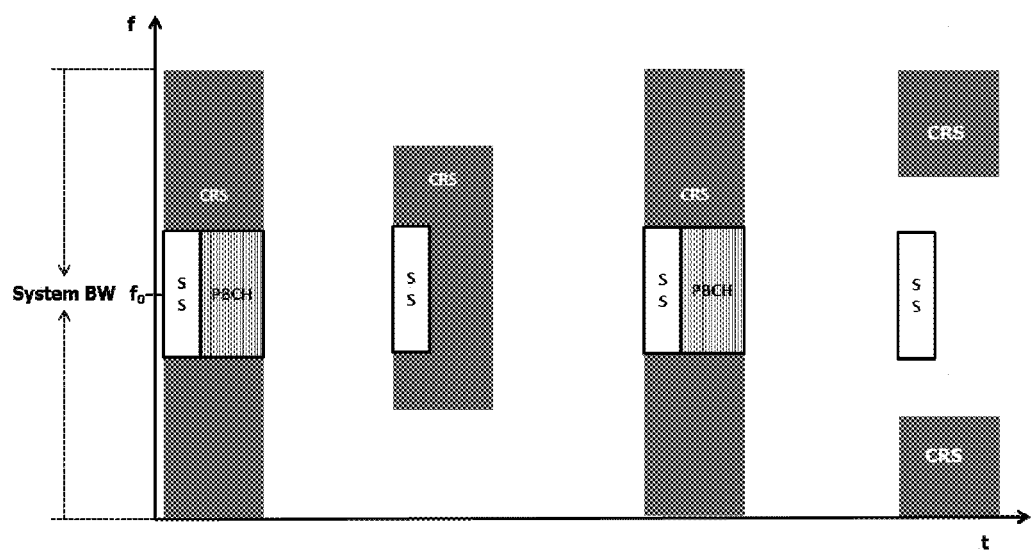

In the example of FIG. 3f, different CRS distribution patterns, which can be referred to as "CRS patterns" or "CRS transmission patterns," are adopted in different time period. This may be referred to as CRS pattern hopping. In one embodiment, the network device may indicate to the terminal device at block 210 how the CRS pattern hops/ changes with time. The CRS pattern hopping may result in a change in at least one of: resource location, density, and bandwidth of the CRS transmission. In the example of FIG. 3*f*, with the pattern hopping, resource location for CRS changes while the density is kept unchanged. In an example shown in FIG. 3*g*, resource location changes with time, but resource bandwidth is kept unchanged. In another example shown in FIG. 3*h*, bandwidth for the CRS also changes with time. As shown in FIG. 3*h*, in a TTI with PBCH, the CRS is wideband, but in other TTIs without PBCH, the CRS can be narrowband. Further, in the other TTIs, a pattern hopping can be used.

As shown in some examples in FIGS. 3*a*-3*h*, the CRS may always exist in several central PRBs in which PBCH is transmitted, so as to facilitating PBCH detection. However, embodiments of the present disclosure are not limited thereto. In another embodiment, the CRS may also be transmitted in a distributed way in the several central PRBs, e.g., with a density of 0.5.

Embodiments of the present disclosure are not limited to any specific way for transmitting the information related to the resource allocation of the signal (e.g., a reference signal like CRS). Just for illustration purpose, some example implementations 211 and 212 of the block 210 are provided in the following with reference to FIG. 4.

Figure 4:
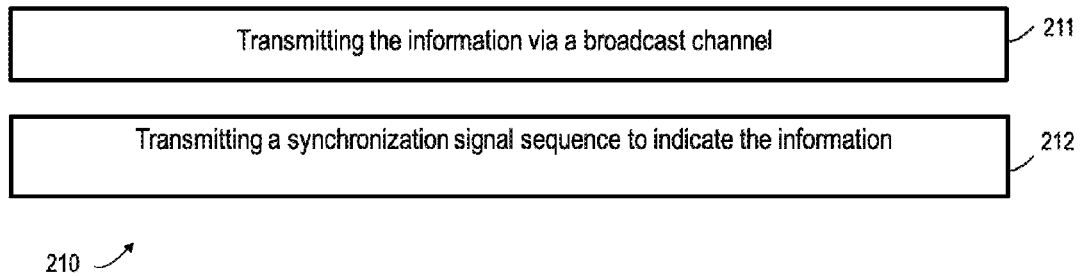
FIG. 4 illustrates example implementations for transmitting information related to resource allocation according to an embodiment of the present disclosure.

As shown in FIG. 4, in one embodiment, the network device may transmit the information via a broadcast channel, at block 211. For example, the network device may transmit at least part of the information as payload of the broadcast channel, such as a PBCH. In particular, the information related to CRS resource allocation may be transmitted as part of the master system block (MIB) in the PBCH as below:

```
MasterInformationBlock :: = {
DL-bandwidth      e.g. n6, n15, n25, n50, n75, n100
CRS bandwidth     e.g. 1, ¾, ½, ¼ of dl-Bandwidth
system frameNumber
...
}
```

That is, the information related to resource allocation may be indicated via a field of "CRS bandwidth" in the MIB. Depending on terminology and/or technology being used, the exact broadcast channel for transmitting the information may vary.

Alternatively or additionally, in another embodiment, the network device may transmit at least part of the information implicitly, for example by transmitting the broadcast channel with a selected CRC mask. The selected CRC mask indicates at least part of the information. For example, assuming there are 4 predefined CRC masks, and then by choosing one CRC mask from the 4 predefined CRC masks, 2-bits information can be indicated.

As shown in FIG. 4, as another alternative, the network device may transmit at least part of the information by transmitting a synchronization signal sequence (SS). That is, at block 212, the network device may transmit a synchronization signal sequence to indicate at least part of the information. In a NR system, length of a cyclic prefix (CP) of a symbol may be UE specific rather than cell specific, and in such a case, it may be unnecessary for the CP related information to be indicated by the SS. In one embodiment, the network device may reuse the CP indication to indicate information related to resource allocation for the signal such as a CRS.

In current LTE, the SS includes a PSS and a SSS. However, embodiments of the present disclosure are not limited to such a design for SS. For example, in another embodiment, the SS may include a single synchronization signal sequence only. In an embodiment where the SSS includes both a PSS and a SSS, the PSS and the SSS may be transmitted within one TTI for forward compatibility, no matter for a frequency division duplex (FDD) system or a time division duplex (TDD) system.

In one embodiment, the network device may use different SS sequences (e.g., different sequence index, or different sequence type, etc.) to indicate CRS resource allocation related information. In another embodiment, the network device may use different root values of the synchronization signal sequence to indicate the information related to resource allocation of the signal. That is, at block 212, the network device may select and transmit a synchronization signal sequence with an associated indication. This associated indication indicates the information related to resource allocation of the signal or part of it.

As described above, the associated indication may include at least one of: a selected index of the synchronization signal sequence, a selected type of the synchronization signal sequence, and a selected root value of the synchronization signal sequence. For example, if the SS is a ZC sequence, then different root values of ZC sequence can be used to indicate the information related to resource allocation of the signal (e.g., CRS). In another embodiment, other sequences than a ZC sequence may be used.

Alternatively or additionally, in another embodiment, the network device may use different time distance between the PSS and the SSS transmissions, or two adjacent PSS transmissions, two adjacent SSS transmissions or two adjacent SS transmissions to indicate the information related to resource allocation of the signal or part of it. That is, at block 212, the network device may transmit a first synchronization signal sequence at a first time instance, and transmit a second synchronization signal sequence at a second time instance. A time gap between the first time instance and the second instance indicates the information related to resource allocation of the signal.

In one embodiment, the first synchronization signal sequence and the second synchronization signal sequence may be a same synchronization signal sequence (e.g., PSS, SSS or SS). In another embodiment, the first synchronization signal sequence and the second synchronization signal sequence may be different. For example, the first synchronization signal sequence and the second synchronization signal sequence may be PSS and SSS respectively.

Figure 5A:
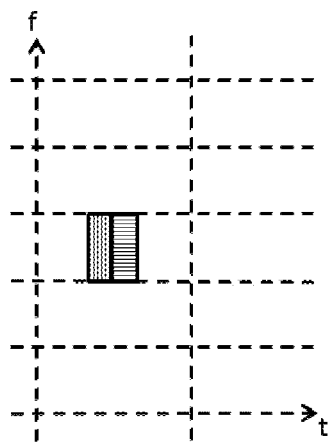
FIGS. 5a-5b illustrate examples for indicating the information based on a time distance/gap.
Figure 5B:
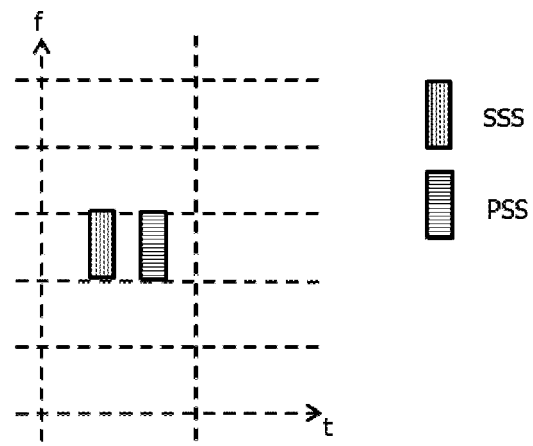

In FIGS. 5*a*-5*b*, examples for indicating the information based on a time distance/gap are presented. In FIG. 5*a*, a time gap of m=1 symbol indicates a wideband CRS, and in FIG. 5*b*, a time gap of n=2 symbols indicates a narrow band CRS, e.g., a CRS with resource allocation of ½ system bandwidth. It should be appreciated that in another embodiment, different values of m and n can be used for such indication. For example, m=3 symbols may indicate a wideband CRS for a TDD system, and n=4 symbols may indicate a narrow band CRS with ½ DL system bandwidth for the TDD system.

Though several embodiments have been described in the context of a CRS resource allocation, it should be appreciated that same principle applies to other signals, e.g., a control signal with system information, such as a SIB. That is, the network device may transmit information related resource allocation of the SIB (e.g., at block 210 of FIG. 2), and then broadcast the SIB in accordance with the resource allocation, for example at block 220 of FIG. 2. Therefore the descriptions provided with reference to CRS also applies to the SIB.

In another embodiment, resource for the control signal (e.g., SIB) transmission may be indicated implicitly. For example, as shown in FIG. 2, the method may optionally comprise a block 230. Throughout the context of the present disclosure, optional elements are shown by dashed blocks in the flowcharts and/or block diagrams. At block 230, the network device may transmit the control signal in a resource located within a resource region (e.g., the central narrow band shown in FIG. 3*a*) allocated for the reference signal. Accordingly, the UEs may only decode the control signal in the configured CRS resource region(s).

Figure 6:
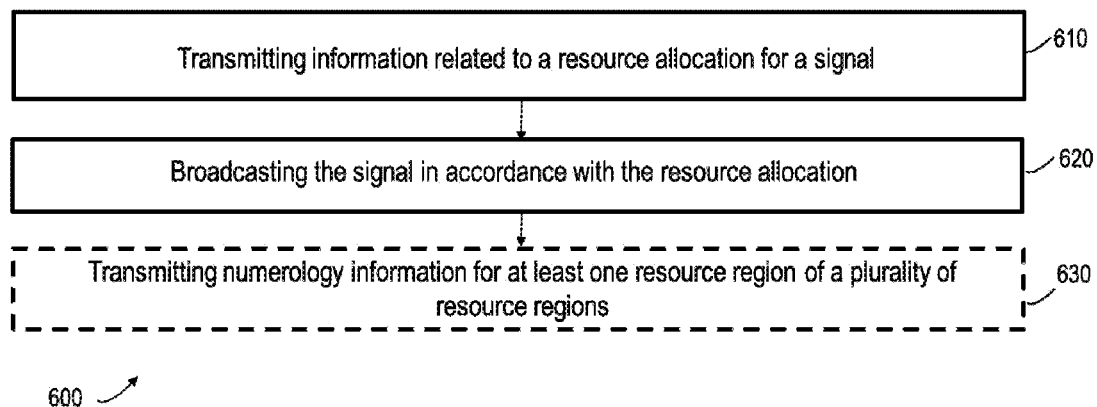
FIG. 6 illustrates a flowchart of another method implemented at a network device according to an embodiment of the present disclosure.

Reference is now made to FIG. 6 which illustrates another method 600 implemented at a network device according to an embodiment of the present disclosure. The method 600 may be considered as another example implementation of method 200. In this example implementation, it is assumed that the system bandwidth of the network device is divided into a plurality of resource regions.

As shown in FIG. 6, the method 600 comprises blocks 610-630. At block 610 and 620, the network may perform similar operation as that of blocks 210 and 220 respectively, and therefore details will be omitted for simplicity. At block 630, the network device transmits numerology information for at least one resource region of the plurality of resource regions. Numerology information may include subcarrier space or CP length, and the like. The method 600 allows the network device to apply different numerologies to different resource regions, and therefore enables more flexibility for the utilization of the resource.

Further, in one embodiment, at block 610, the network device may transmit the information related to the resource allocation for the signal for at least one resource region of the plurality of resource regions. In this way, the network device may allocate resource for the signal in different manners in the plurality of resource regions. For example, the network device may configure resource for the signal only in certain regions, and/or, the network device may configure different resource allocation pattern for each resource region. In this way, flexibility of resource configuration can be further improved.

Figure 7A:
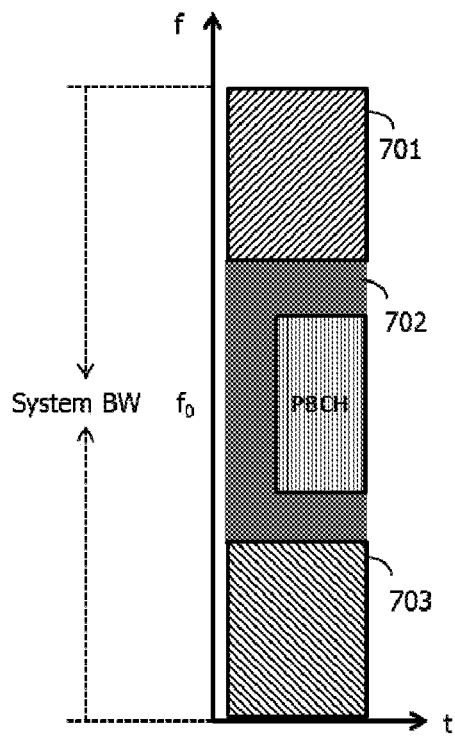
FIGS. 7a-7b illustrate a schematic block diagram of indicating numerology information for resource regions.
Figure 7B:
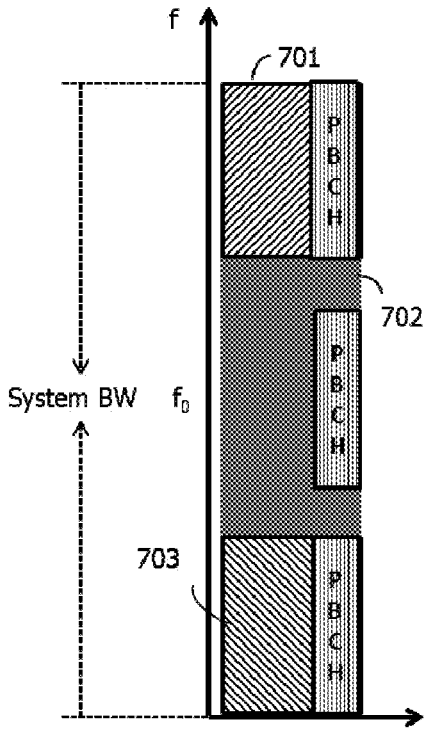

In FIGS. 7*a*-7*b*, examples of dividing the system bandwidth into three resource regions (701, 702, and 703) are illustrated. However, it can be appreciated that in other examples, the system bandwidth may be divided into more or less resource regions. The network device may transmit numerology information (e.g., via block 630) and/or information related to the resource allocation for the signal (e.g., via block 610) for one or more resource regions in various ways. For example, as shown in FIG. 7*a*, at block 630, the network device may transmit the numerology information for at least one resource region via a single broadcast channel in one of the at least one resource region (the central resource region 702 in this example). Alternatively or additionally, at block 610, the network device may transmit the information related to the resource allocation for the signal for at least one resource region via a single broadcast channel in one of the at least one resource region. For example, the network device may transmit the numerology information for all resource regions except the central resource region and/or information related to the resource allocation for the signal for all resource regions via a PBCH in the central resource region. The numerology for the central resource region may be fixed or predefined.

In another embodiment, as shown in FIG. 7*b*, the network device may transmit numerology information and/or information related to the resource allocation for the signal for a respective resource region via a broadcast channel in the respective resource region. That is, the network device may transmit the numerology information for the i-th resource region (e.g., 701 shown in FIG. 7*b*) via a broadcast channel (e.g., PBCH) in the i-th resource region. In another embodiment, the network device 101 may transmit the numerology information and the information related to the resource allocation for the signal in different ways. For example, the numerology information may be transmitted in a manner as shown in FIG. 7*a* at block 630, while the information related to the resource allocation for the signal may be transmitted in a manner as shown in FIG. 7*b* at block 610, or vice versa.

Figure 8A:
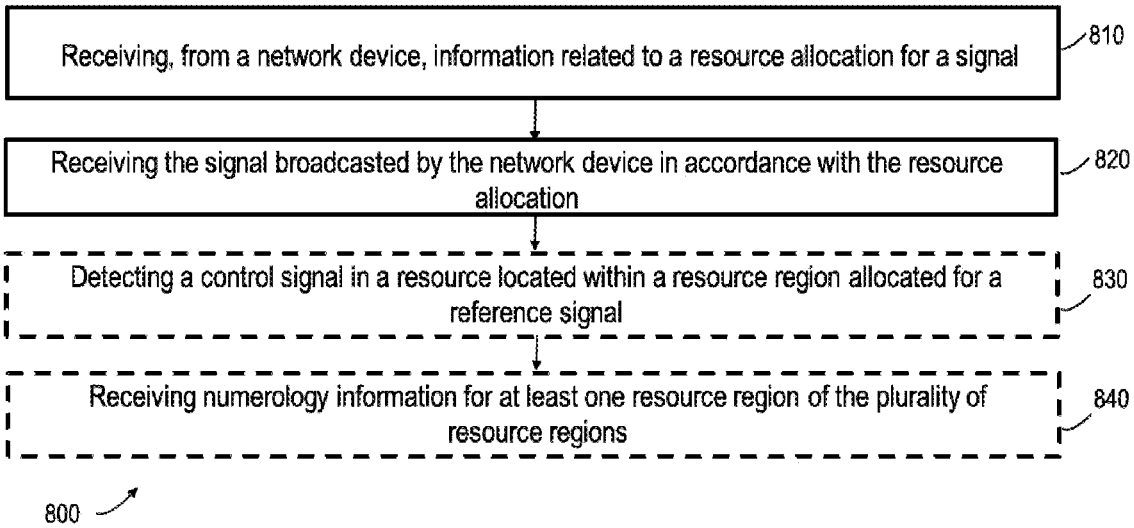
FIGS. 8a-8b illustrate flowcharts of a method implemented at a terminal device according to an embodiment of the present disclosure.

Reference is now made to FIG. 8*a*, which shows a flowchart of a method 800 implemented at a terminal device side according to an embodiment of the present disclosure. For simplicity, the method 800 will be described below with reference to the terminal device 102 shown in FIG. 1, however, it can be appreciated that, the method 800 could also be implemented by any other terminal device.

As illustrated in FIG. 8*a*, at block 810, the terminal device 102 receives, from a network device (e.g., network device 101), information related to a resource allocation for a signal. The information received by the terminal device 102 may be that transmitted by the network device 101 according to method 200 or 600 described with reference to FIG. 2 and FIG. 6 respectively. Therefore, descriptions with respect to the signal and the information related to the resource allocation for the signal provided with reference to method 200 and 600 also apply here and details will not be repeated for simplicity. For example, as described with reference to method 200 and 600, the signal may include at least one of a reference signal (such as, but not limited to, CRS) and a control signal containing system information (such as, but not limited to, SIB). Some examples for the resource allocation for the signal can be found in FIGS. 3*a*-3*h*.

Figure 8B:
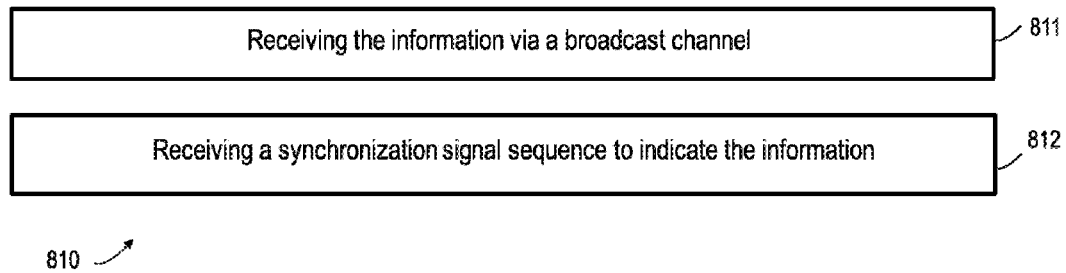

Depending on the transmission schemes used for the information at the transmitter side, the terminal device may receive the information in different ways. In FIG. 8*b*, example implementations 811 and 812 of the block 810 are provided for illustration.

In one embodiment, as described with reference to FIG. 4, the network device 101 may transmit the information related to resource allocation of the signal via a broadcast channel. Accordingly, as shown in FIG. 8*b*, at block 811, the terminal device may receive the information via a broadcast channel. In one embodiment, at block 811, the terminal device may receive the information by detecting payload (e.g., MIB) of the broadcast channel. In another embodiment, at block 811, the terminal device may detect a CRC mask of the broadcast channel, and obtain the information based on the detected CRC mask.

In another embodiment, the network device may transmit the information by transmitting a synchronization signal sequence, for example at block 212 of FIG. 4. In this case, as shown in FIG. 8*b*, the terminal device may receive the information by detecting the synchronization signal sequence at block 812. For example, the terminal device may detect an indication associated with the synchronization signal sequence, and obtain the information or a part of it based on the detected indication. In one embodiment, the detected indication may include at least one of an index, a type, and a root value of the synchronization signal sequence. In this way, the terminal device derives the information implicitly.

Alternatively or additionally, in another embodiment, at block 812, the terminal device may receive a first synchronization signal sequence at a first time instance, and receive a second synchronization signal sequence at a second time instance; and then obtain the information based on a time gap between the first time instance and the second instance. In one embodiment, the first synchronization signal sequence and the second synchronization signal sequence may be a same synchronization signal sequence (e.g., PSS, SSS or SS). In another embodiment, the first synchronization signal sequence and the second synchronization signal sequence may be different. For example, the first synchronization signal sequence and the second synchronization signal sequence may be PSS and SSS respectively.

Still in reference to FIG. 8*a*, at block 820, the terminal device receives the signal broadcasted by the network device in accordance with the resource allocation. In one embodiment, the signal may be a reference signal similar as CRS specified in LTE. At this point, at block 820, the terminal device may receive the reference signal in the resource allocation indicated by the received information at block 810. In another embodiment, the signal may be a control signal, similar as system information block 1 (SIB1) specified in LTE, and at block 820, the terminal device may receive the control signal in the resource allocation indicated by the received information at block 810.

Optionally, in one embodiment, the resource allocation for the control signal such as SIB may be predefined to be within the resource region allocated for the reference signal such as CRS. In such embodiment, as shown in FIG. 8*a*, the method 800 may further comprise a block 830 where the terminal device 102 may detect the control signal in a resource located within the resource region allocated for the reference signal. With this embodiment, detection of the SIB may be simplified.

In some embodiments, the system bandwidth of the network device 101 may be divided into a plurality of resource regions, and different numerology may be applied in different resource regions to improve resource utilization flexibility. To enable this, as shown in FIG. 8*a*, the method 800 may optionally comprise a block 840. At the block 840, the terminal may receive numerology information for at least one resource region of the plurality of resource regions. Alternatively or additionally, in another embodiment, at the block 810, the terminal may receive information related to the resource allocation for the signal for at least one resource region of the plurality of resource regions.

In one embodiment, at block 840, the terminal device may receive numerology information for the at least one resource region via a broadcast channel in one of the at least one resource region. In one embodiment, the numerology for the resource region where the broadcast channel locates may be fixed or predefined. In another embodiment, at block 810, the terminal device may receive information related to the resource allocation for the signal for the at least one resource region via a broadcast channel in one of the at least one resource region.

In another embodiment, there may be a broadcast channel in more than one resource regions. In some embodiments, at block 840, the terminal device may receive numerology information for a respective resource region of the at least one resource region via a broadcast channel in the respective resource region. Alternatively or additionally, in another embodiment, at block 810, the terminal device may receive information related to the resource allocation for the signal for a respective resource region of the at least one resource region via a broadcast channel in the respective resource region. This enables to distribute the numerology information and/or information related to the resource allocation for the signal into several broadcast channels.

Embodiments of the present disclosure are not limited to any specific number of resource regions and number of broadcast channels for sending the numerology information.

Figure 8C:
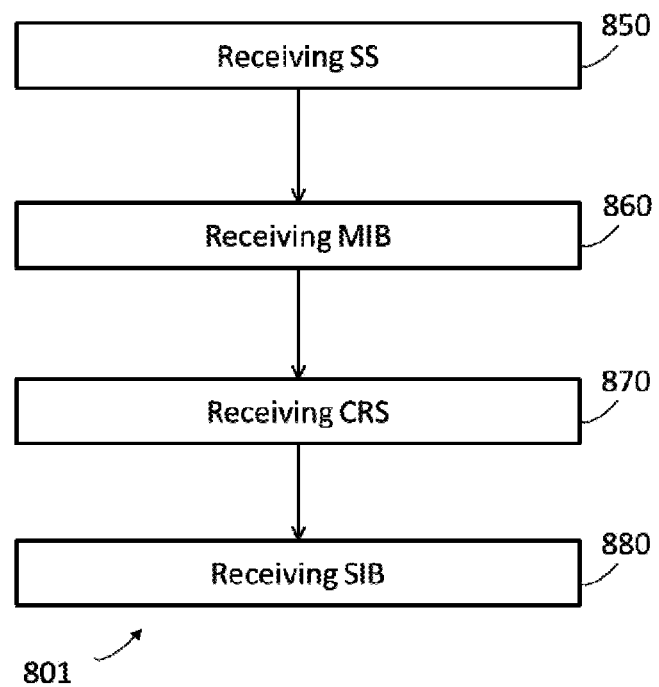
FIG. 8c illustrates a flowchart of another method implemented at a terminal device according to an embodiment of the present disclosure.

Another example implementation 801 of the method 800 is illustrated in FIG. 8*c*. As shown in FIG. 8*c*, the terminal device may receive a SS at block 850. The SS may be transmitted by a network device periodically on fixed frequency/time resources. In one embodiment, like legacy LTE, SS may include a PSS and a SSS. In another embodiment, similar transmit mechanism as that in LTE can be used in a NR system, but the PSS and the SSS may be transmitted within one TTI in the central 6 or several PRBs. After detecting the SS, the terminal device may obtain coarse synchronization with the network device, a cell ID and a duplex type.

At block 860, the terminal device may receive the PBCH transmitted by the network device. MIB may be transmitted in the PBCH by the network device. After detection/reception of the PBCH, the terminal device may obtain information related to a system bandwidth, a number of CRS ports and a frame number. In one embodiment, the terminal device may also obtain information related to a resource allocation for the CRS, e.g., information on CRS bandwidth/periodicity/CRS density/position, and the like. In another embodiment, the information related to the resource allocation of the CRS may be instead obtained via the SS received at block 850. In a further embodiment, the information related to resource allocation of the CRS may be obtained based on a combination of the SS detected at block 850 and the MIB detected at block 860. For simplicity, the CRS bandwidth can be a fraction of system bandwidth, e.g. 1, ¾, ½, ¼ of system bandwidth. In still another embodiment, the terminal device may obtain information on possible time/frequency positons of the SIB via the reception at block 850 and/or 860.

Then, at block 870, the CRS is transmitted by the network device on the configured time/frequency resources according to the information transmitted in the SS and/or MIB, and then the terminal device detects the CRS according to the obtained information related to the resource allocation. The terminal may perform fine synchronization and/or RRM measurement based on the detected CRS. Optionally, the network device may transmit the SIB on the configured time/frequency resources according to the information transmitted in the SS and/or MIB. That is, in one embodiment, transmission periodicity, time offset between two synchronization signal sequences and frequency region of the SIB may be broadcasted via MIB and/or SS. In another embodiment, the resource for SIB may be predefined to be within the configured resource region for the CRS. At block 880, the terminal device detects the SIB in accordance with the obtained information on resource allocation of CRS and/or SIB at block 850 and/or 860.

Figure 9:
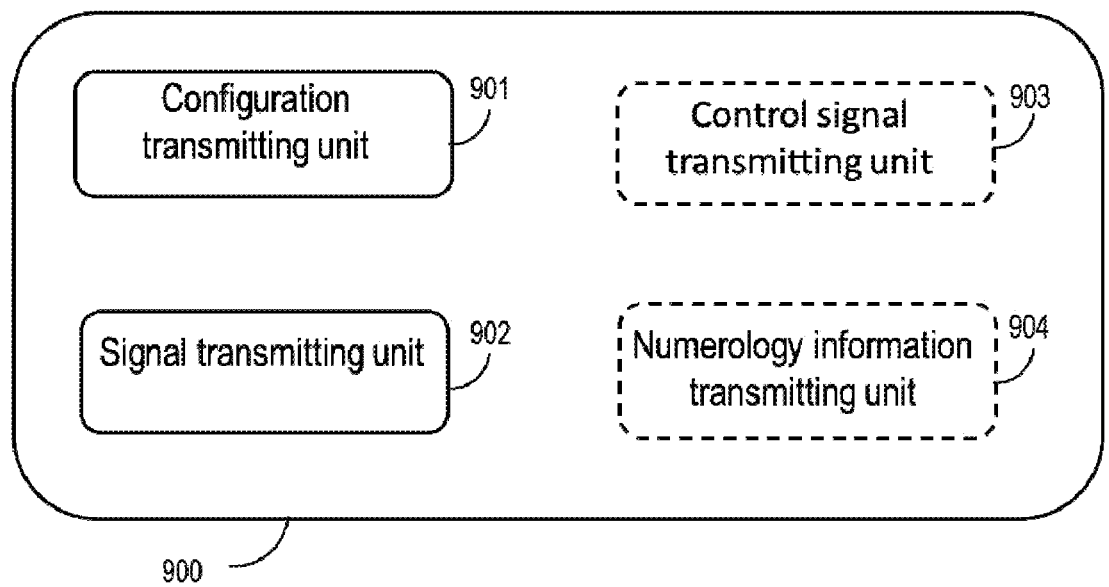
FIG. 9 illustrates a schematic block diagram of an apparatus 900 implemented as/in a network device according to an embodiment of the present disclosure.

Reference is now made to FIG. 9, which illustrates a schematic block diagram of an apparatus 900 in a wireless communication network (e.g., the wireless communication network 100 shown in FIG. 1). The apparatus 900 may be implemented as/in a network device, e.g., the network device 101 shown in FIG. 1. The apparatus 900 is operable to carry out the example method 200 or 600 described with reference to FIGS. 2-7 and possibly any other processes or methods. It is also to be understood that the method 200 or 500 is not necessarily carried out by the apparatus 900. At least some steps of the method 200 can be performed by one or more other entities.

As illustrated in FIG. 9, the apparatus 900 includes a configuration transmitting unit 901, configured to transmit information related to a resource allocation for a signal; and a signal transmitting unit 902, configured to broadcast the signal in accordance with the resource allocation. In one embodiment, the signal may include at least one of: a reference signal, and a control signal containing system information.

In some embodiments, the apparatus 900 may be used to perform the method 200 or 600, and therefore, descriptions with respect to the operations of transmitting of the information and broadcasting of the signal, provided with respect to method 200 and 600, also apply to the configuration transmitting unit 901 and the signal transmitting unit 902. Likewise, the descriptions with respect to the information and the signal provided with reference to method 200 and 600 also apply here, and details will not be repeated for simplicity.

In one embodiment, the configuration transmitting unit 901 may be configured to transmit the information or a part of it via a broadcast channel. For example, the configuration transmitting unit 901 may be configured to transmit the information as payload, or transmit the broadcast channel with a selected CRC mask, and the selected CRC mask indicates the information.

Alternatively or additionally, in another embodiment, the configuration transmitting unit 901 may be configured to indicate the information or a part of it by transmitting a synchronization signal sequence. For example, the configuration transmitting unit 901 may be configured to transmit the synchronization signal sequence with an associated indication, where the associated indication indicates the information. In one embodiment, the associated indication may include at least one of a selected index, a selected type, and a selected root value of the synchronization signal sequence. In another embodiment, the configuration transmitting unit 901 may be is configured to transmit a first synchronization signal sequence at a first time instance, and transmit a second synchronization signal sequence at a second time instance; and a time gap between the first time instance and the second instance may indicates the information.

Optionally, in one embodiment, the apparatus 900 may further comprise a control signal transmitting unit 903, configured to transmit the control signal in a resource located within a resource region allocated for the reference signal.

In another embodiment, a system bandwidth of the network device is divided into a plurality of resource regions, and the apparatus 900 may further comprise a numerology information transmitting unit 904, configured to transmit numerology information for at least one resource region of the plurality of resource regions.

Just for illustration purpose, in one embodiment, the numerology information transmitting unit 904 may be configured to transmit numerology information for the at least one resource region via a broadcast channel in one of the at least one resource region. In another embodiment, the numerology information transmitting unit 904 may be configured to transmit numerology information for the at least one resource region via a plurality of broadcast channels. For example, the numerology information transmitting unit may be configured to transmit numerology information for a respective resource region of the at least one resource region via a broadcast channel in the respective resource region.

Figure 10:
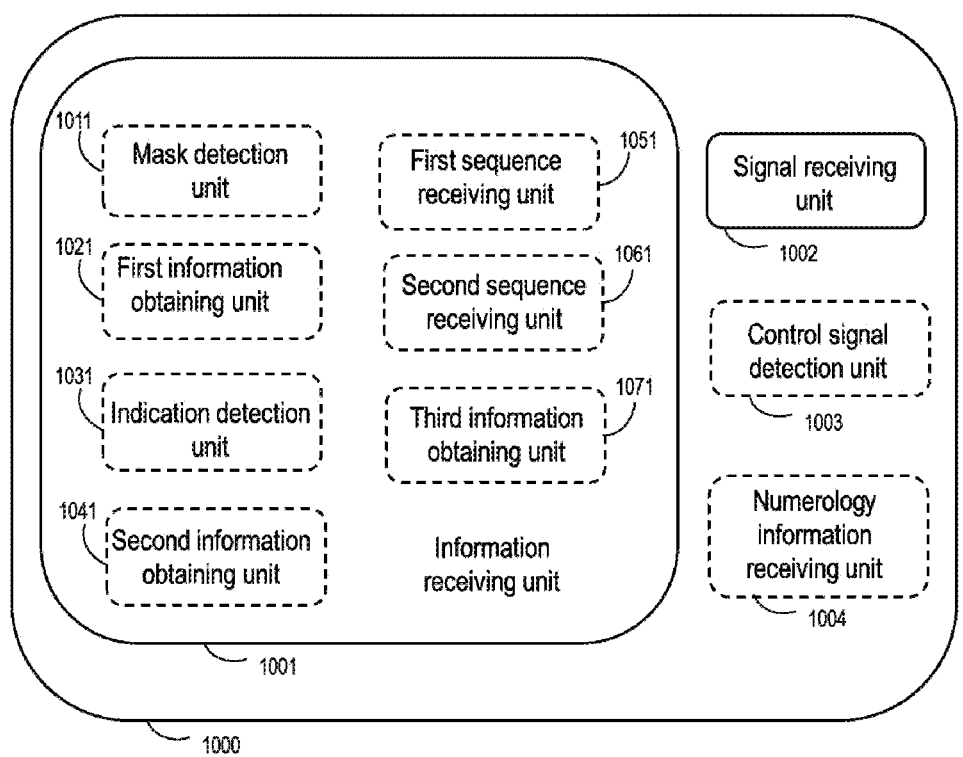
FIG. 10 illustrates a schematic block diagram of an apparatus 1000 implemented as/in a terminal device according to an embodiment of the present disclosure.

Reference is now made to FIG. 10, which illustrates a schematic block diagram of an apparatus 1000 in a wireless communication network (e.g., the wireless communication network 100 shown in FIG. 1). The apparatus 1000 may be implemented as/in a terminal device, e.g., the terminal device 102 shown in FIG. 1. The apparatus 1000 is operable to carry out the example method 800 described with reference to FIGS. 8a-8b and possibly any other processes or methods. It is also to be understood that the method 800 is not necessarily carried out by the apparatus 1000. At least some steps of the method 800 can be performed by one or more other entities.

As illustrated in FIG. 10, the apparatus 1000 includes an information receiving unit 1001 and a signal receiving unit 1002. The information receiving unit 1001 is configured to receive, from a network device (e.g., the network device 101 shown in FIG. 1), information related to a resource allocation for a signal; and the signal receiving unit 1002 may be configured to receive the signal broadcasted by the network device in accordance with the resource allocation. The information and the signal received the apparatus 1000 may be that transmitted by the network device 101 according to method 200 or 600, therefore, descriptions with respect to the signal and the information related to the resource allocation of the signal provided with reference to method 200 and 600 also apply here, and details will not be repeated for simplicity.

In one embodiment, the information receiving unit 1001 may be configured to receive the information via a broadcast channel. For example, the information receiving unit 1001 may be configured to receive the information by detecting payload of the broadcast channel, or the information receiving unit 1001 may comprise a mask detection unit 1011 configured to detect a CRC mask of the broadcast channel, and a first information obtaining unit 1021, configured to obtain the information based on the detected CRC mask.

Alternatively or additionally, in one embodiment, the information receiving unit 1001 may be configured to receive the information or a part of it by detecting a synchronization signal sequence. For example, the information receiving unit 1001 may comprise an indication detection unit 1031 and a second information obtaining unit 1041. The indication detection unit 1031 is configured to detect an indication associated with the synchronization signal sequence, the associated indication including at least one of an index, a type, and a root value of the synchronization signal sequence. The second information obtaining unit 1041 is configured to obtain the information based on the detected indication.

As another example, the information receiving unit 1001 may comprise a first sequence receiving unit 1051 configured to receive a first synchronization signal sequence at a first time instance, a second sequence receiving unit 1061 configured to receive a second synchronization signal sequence at a second time instance, and a third information obtaining unit 1071, configured to obtain the information based on a time gap between the first time instance and the second instance.

As shown in FIG. 10, in one embodiment, the apparatus 1000 may further comprise a control signal detection unit 1003, configured to detect the control signal in a resource located within a resource region allocated for the reference signal.

In some embodiments, the system bandwidth of the network device may be divided into a plurality of resource regions, and the apparatus 1000 may further comprises a numerology information receiving unit 1004, configured to receive numerology information for at least one resource region of the plurality of resource regions. In one embodiment, the numerology information receiving unit 1004 may be configured to receive numerology information for the at least one resource region via a broadcast channel in one of the at least one resource region. In another embodiment, the numerology information receiving unit 1004 may be configured to receive numerology information for a respective resource region of the at least one resource region via a broadcast channel in the respective resource region.

Figure 11:
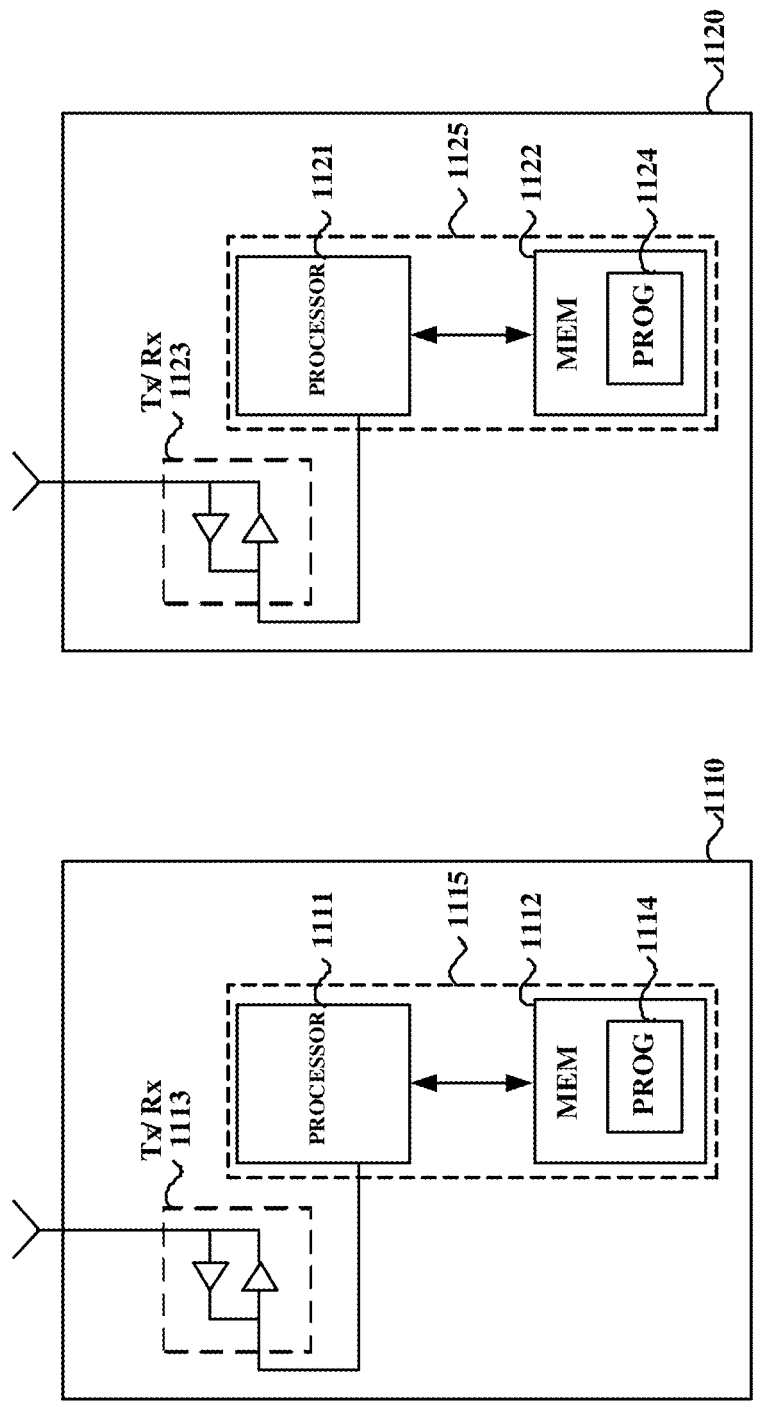
FIG. 11 illustrates a simplified block diagram of an apparatus 1110 that may be embodied as/in a network device, and an apparatus 1120 that may be embodied as/in a terminal device.

FIG. 11 illustrates a simplified block diagram of an apparatus 1110 that may be embodied in/as a network device, e.g., the network device 101 shown in FIG. 1, and an apparatus 1120 that may be embodied in/as a terminal device, e.g., one of the terminal devices 102 and 103 shown in FIG. 1.

The apparatus 1110 may include at least one processor 1111, such as a data processor (DP) and at least one memory (MEM) 1112 coupled to the processor 1111. The apparatus 1110 may further include a transmitter TX and receiver RX 1113 coupled to the processor 1111. The MEM 1112 may be non-transitory machine readable storage medium and it may store a program (PROG) 1114. The PROG 1114 may include instructions that, when executed on the associated processor 1111, enable the apparatus 1110 to operate in accordance with the embodiments of the present disclosure, for example to perform the method 200 or 600. A combination of the at least one processor 1111 and the at least one MEM 1112 may form processing means 1115 adapted to implement various embodiments of the present disclosure.

The apparatus 1120 includes at least one processor 1121, such as a DP, and at least one MEM 1122 coupled to the processor 1121. The apparatus 920 may further include a suitable TX/RX 1123 coupled to the processor 1121. The MEM 1122 may be non-transitory machine readable storage medium and it may store a PROG 1124. The PROG 1124 may include instructions that, when executed on the associated processor 1121, enable the apparatus 1120 to operate in accordance with the embodiments of the present disclosure, for example to perform the method 800. A combination of the at least one processor 1121 and the at least one MEM 1122 may form processing means 1125 adapted to implement various embodiments of the present disclosure.

Various embodiments of the present disclosure may be implemented by computer program executable by one or more of the processors 1111 and 1121, software, firmware, hardware or in a combination thereof.

The MEMs 1112 and 1122 may be of any type suitable to the local technical environment and may be implemented using any suitable data storage technology, such as semiconductor based memory terminal devices, magnetic memory terminal devices and systems, optical memory terminal devices and systems, fixed memory and removable memory, as non-limiting examples.

The processors 1111 and 1121 may be of any type suitable to the local technical environment, and may include one or more of general purpose computers, special purpose computers, microprocessors, digital signal processors DSPs and processors based on multicore processor architecture, as non-limiting examples.

Although some of the above description is made in the context of a NR system, it should not be construed as limiting the spirit and scope of the present disclosure. The principle and concept of the present disclosure may be more generally applicable to other wireless systems.

In addition, the present disclosure may also provide a memory containing the computer program as mentioned above, which includes machine-readable media and machine-readable transmission media. The machine-readable media may also be called computer-readable media, and may include machine-readable storage media, for example, magnetic disks, magnetic tape, optical disks, phase change memory, or an electronic memory terminal device like a random access memory (RAM), read only memory (ROM), flash memory devices, CD-ROM, DVD, Blue-ray disc and the like. The machine-readable transmission media may also be called a carrier, and may include, for example, electrical, optical, radio, acoustical or other form of propagated signals—such as carrier waves, infrared signals, and the like.

The techniques described herein may be implemented by various means so that an apparatus implementing one or more functions of a corresponding apparatus described with an embodiment includes not only prior art means, but also means for implementing the one or more functions of the corresponding apparatus described with the embodiment and it may include separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Example embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including hardware, software, firmware, or a combination thereof. For example, each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a base station, the method comprising:
   transmitting to a user equipment (UE), by a Master Information Block (MIB), first information indicating a subcarrier spacing for a System Information Block (SIB); and
   transmitting the SIB to the UE.

2. The method of claim 1, further comprising:
   transmitting second information indicating a number of resource blocks for a control signal related to the SIB.

3. The method of claim 2, wherein the second information indicates a transmission opportunity in time domain for the control signal related to the SIB.

4. The method of claim 2, further comprising: transmitting a synchronization signal for the second information.

5. A method performed by a user equipment (UE), the method comprising:
   receiving from a base station, by a Master Information Block (MIB), first information indicating a subcarrier spacing for a System Information Block (SIB); and
   receiving the SIB from the base station.

6. The method of claim 5, further comprising:
   receiving second information indicating a number of resource blocks for a control signal related to the SIB.

7. The method of claim 6, wherein the second information indicates a transmission opportunity in time domain for the control signal related to the SIB.

8. The method of claim 6, further comprising:
   receiving a synchronization signal for the second information.

9. The method of claim 1, wherein a value of the subcarrier spacing is dependent on a frequency band region where the MIB is transmitted.

10. The method of claim 5, wherein a value of the subcarrier spacing is dependent on a frequency band region where the MIB is transmitted.

11. A base station comprising:
    a transceiver; and
    a processor configured to control the transceiver to:
       transmit to a user equipment (UE), by a Master Information Block (MIB), first information indicating a subcarrier spacing for a System Information Block (SIB); and
       transmit the SIB to the UE.

12. The base station of claim 11, wherein the processor is further configured to control the transceiver to:
    transmit second information indicating a number of resource blocks for a control signal related to the SIB.

13. The base station of claim 12, wherein the second information indicates a transmission opportunity in time domain for the control signal related to the SIB.

14. The base station of claim 12, further comprising:
    transmitting a synchronization signal for the second information.

15. The base station of claim 11, wherein a value of the subcarrier spacing is dependent on a frequency band region where the MIB is transmitted.

* * * * *